June 24, 1930.　　　　L. M. WOOLSON　　　　1,766,868
INTERNAL COMBUSTION ENGINE
Filed March 9, 1928　　　　2 Sheets-Sheet 1
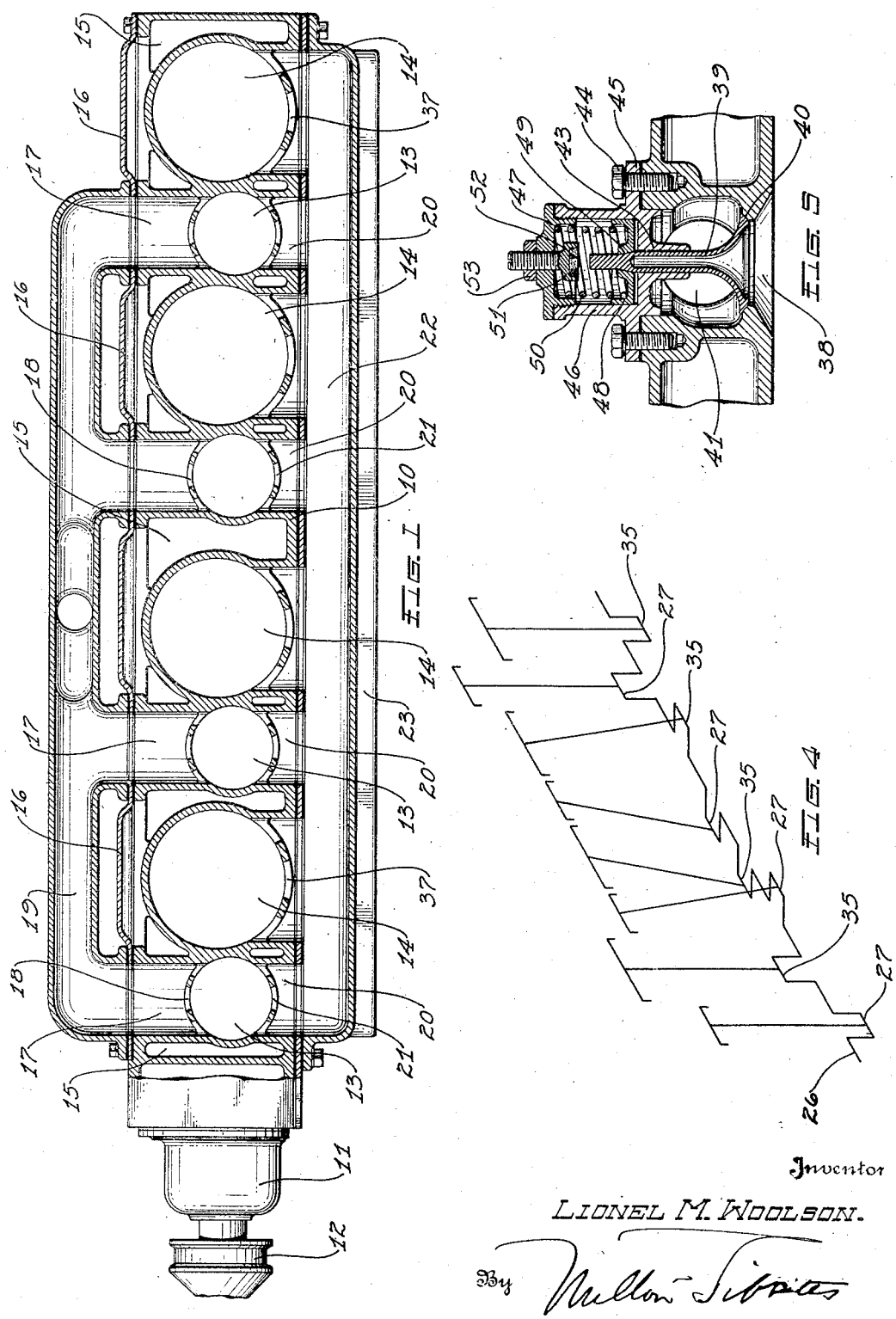
Inventor
LIONEL M. WOOLSON.
By Milton Tibbits
Attorney June 24, 1930.  L. M. WOOLSON  1,766,868
INTERNAL COMBUSTION ENGINE
Filed March 9, 1928  2 Sheets-Sheet 2
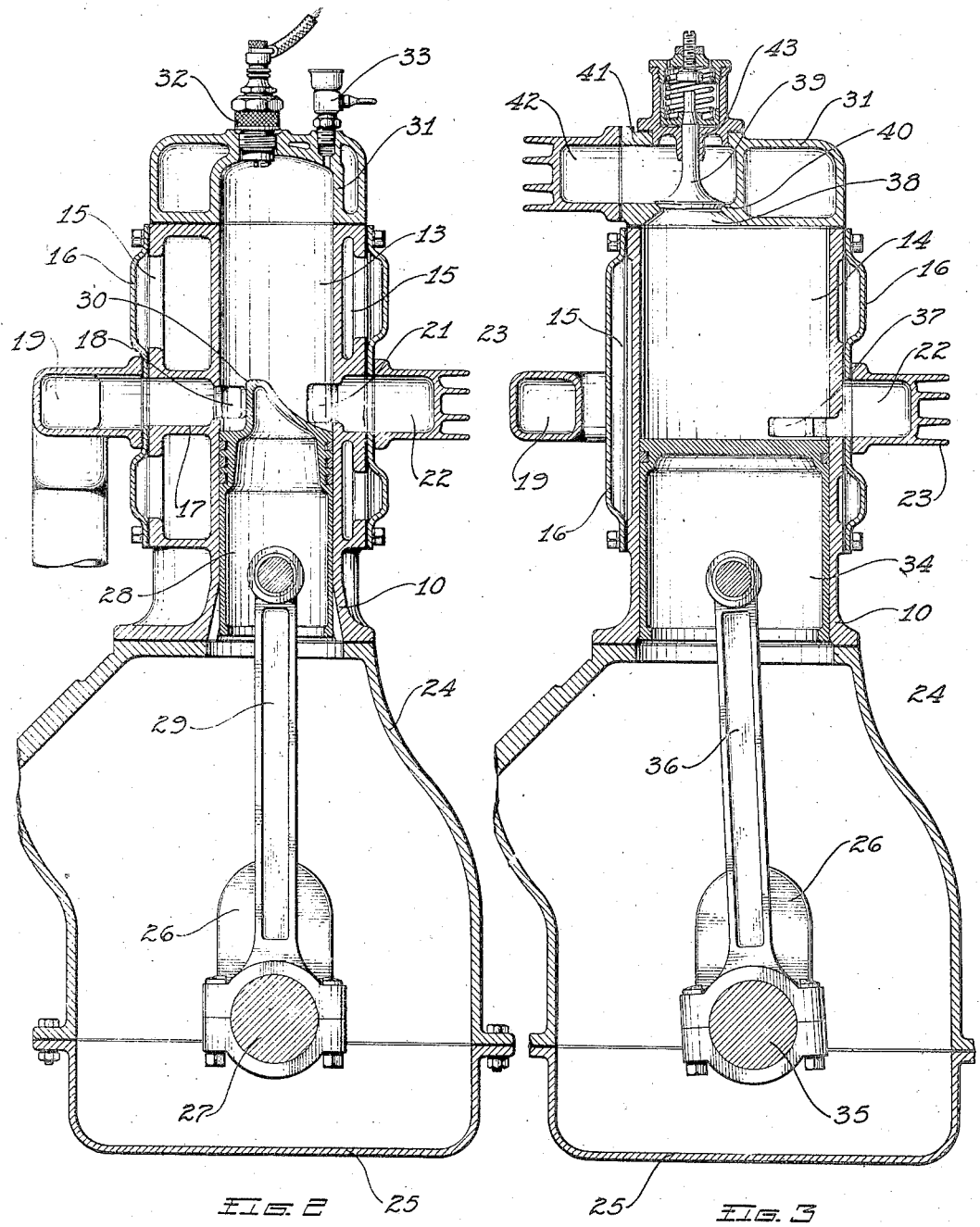
Inventor
LIONEL M. WOOLSON.
By
Attorney Patented June 24, 1930

1,766,868

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

INTERNAL-COMBUSTION ENGINE

Application filed March 9, 1928. Serial No. 260,267.

This invention relates to internal combustion engines and more particularly to that type of engine in which the cylinders are scavenged.

Heretofore internal combustion engines operating on the two-stroke cycle have not in general possessed the flexibility of engines operating on the four-stroke cycle because the former have not been capable of the efficient and smooth low-speed operation usually characterizing the latter. Generally, when the two-stroke cycle engine has not been scavenged, throttled or low-speed performance has not been smooth because of the dilution of the charge and consequent misfiring and when one of the methods of scavenging heretofore in use has been employed, either the scavenging has not been thorough at the lower engine speeds as a result of which the engine would misfire, or the charge has been under too great a pressure before compression to permit the engine to be throttled to desired low speeds and yet obtain smooth running. Thus the flexibility of the two-stroke cycle engine has not compared favorably with that of the four-stroke cycle engine principally because the scavenging methods heretofore in use have not been sufficiently effective at the lower engine speeds or because they have not thoroughly evacuated the cylinders of burned gases at such speeds without placing the charge under an undesirable pressure before the compression stroke.

It is an object of the present invention to provide improved means for scavenging the cylinders of internal combustion engines.

Another object of the invention is to provide means for scavenging the cylinders of an internal combustion engine adapted to thoroughly evacuate the cylinders of burned gases at all engine speeds, particularly the lower speeds.

Another object of the invention is to improve the flexibility of an internal combustion engine of the two-stroke cycle type.

Another object of the invention is to improve the flexibility of a two-stroke cycle internal combustion engine by scavenging.

Other objects of the invention will appear from the following description taken in connection with the drawings forming a part of this specification, in which:

Fig. 1 is a sectional view of the cylinder block of an internal combustion engine embodying the invention, with the intake and exhaust manifolds mounted on the block;

Fig. 2 is a vertical sectional view of one of the working cylinders of the engine;

Fig. 3 is a vertical sectional view of one of the scavenging cylinders of the engine;

Fig. 4 is a diagrammatic illustration of the crank shaft of the engine with the pistons and connecting rods connected thereto, and Fig. 5 is an enlarged sectional view of the exhaust valve of a scavenging cylinder of the engine.

Referring to the drawings, 10 represents the cylinder block of an internal combustion engine embodying the present invention. At the front end of the block, a bracket 11 is mounted to support a fan shaft, not shown, carrying a fan pulley 12. As shown, the block is provided with eight cylinders, four of which are working cylinders and the other four are scavenging cylinders. The working cylinders 13 are arranged alternately with the scavenging cylinders 14 and are preferably of smaller diameter than the scavenging cylinders, as clearly shown. The block 10 is provided with the usual water jackets 15, and cover plates 16 secured to the sides of the block 10 in any suitable manner to close the water jacket openings. Intake passages 17 formed in the cylinder block communicate with each of the working cylinders 13 through intake ports 18 and with an intake manifold 19 removably secured to the cylinder block. Exhaust passages 20 arranged in the cylinder block oppositely to the intake passages, communicate with each of the working cylinders 13 through exhaust ports 21 and with an exhaust manifold 22 removably secured to the cylinder block. The exhaust manifold is provided with a series of cooling fins 23 adapted to facilitate radiation of heat from the manifold.

In Fig. 2, one of the working cylinders 13 of the engine is shown in vertical section.

The working cylinders operate on the two-stroke cycle and their construction is in accordance with established practice. The cylinder block 10 is removably secured to a crank case 24, the open lower portion of which is closed by a cover 25. Journaled in suitable bearings in the crank case is a crank shaft 26 having a plurality of cranks 27 for the working cylinders arranged, in the present instance, as shown diagrammatically in Fig. 4 to provide a power impulse at ninety degree intervals during each revolution of the shaft. Each of the working cylinders is provided with a piston 28 connected to crank shaft 26 through a connecting rod 29 and the head of each piston is formed to provide a deflector 30. The upper end of the cylinder is closed by a head 31 having the usual spark plug 32 and a priming cock 33 mounted therein for each working cylinder. The operation of this type of internal combustion engine is well understood in the art and requires no explanation.

In Fig. 3 is shown in vertical section, one of the scavenging cylinders 14 of the engine. Each of the scavenging cylinders is provided with a piston 34 connected to one of a series of scavenging cylinder crank pins 35 of crank shaft 26 through a connecting rod 36. Each scavenging cylinder is also provided with an intake port 37 communicating with exhaust manifold 22. Cylinder head 31 closing the upper end of each scavenging cylinder is preferably formed so that there will be a minimum of clearance between the head and the piston when the piston is in upper dead center position. Each scavenging cylinder has an exhaust port 38 adapted to be closed by a pressure operated valve 39 seating on a seat 40, and formed in head 31 for each of the scavenging cylinders is an exhaust passage 41 communicating with exhaust port 38 and with an exhaust manifold 42 secured to the head 31 and adapted to convey the gases into an exhaust muffler, not shown, and thence into the atmosphere. Each of valves 39 is mounted in a suitable guide 43 secured in head 31 in any suitable manner, as by bolts 44 or the like, passing through an annular flange 45 formed on a preferably integral cylindrical extension 46 of the valve guide. A cover 47 threaded into the cylindrical extension 46 closes the open end thereof and between this cover and a rest 48 mounted on a conical portion 49 of the stem of valve 39 is a compression spring 50 adapted to yieldingly press valve 39 against its seat. Valve 39 is preferably hollowed out as shown in Fig. 5 to reduce the weight of the valve. To limit the opening movement of valve 39, an adjustable stop 51 having an insert 52 of suitable sound-deadening material is threaded into cover 47 and held in adjusted position by a lock nut 53.

The crank pins of crank shaft 26 are so arranged that a working cylinder piston and a scavenging cylinder piston work together, that is, the cranks are so arranged that a working cylinder piston and a scavenging cylinder piston occupy substantially similar positions in their respective cylinders throughout the engine cycle. This is diagrammatically illustrated in Fig. 4, wherein the crank positions for each working and scavenging cylinder are clearly shown. Thus, numbering the cylinders consecutively from the front of the engine, the crank pins on the crank shaft for working cylinder No. 1 and scavenging cylinder No. 8 are aligned; the crank pins for working cylinder No. 3 and scavenging cylinder No. 6 are aligned; the crank pins for working cylinder No. 5 and scavenging cylinder No. 4 are aligned, and the crank pins for working cylinder No. 7 and scavenging cylinder No. 2 are aligned. With this arrangement, better engine balance is obtained than would be possible if adjacent working and scavenging cylinders worked together. The firing order of the engine shown is 1—5—7—3, but it will be understood that the crank shaft may be changed to provide other firing orders, if desired.

As shown, the line of centers of the working cylinders and the line of centers of the scavenging cylinders of the engine do not coincide. The working cylinders are offset preferably toward the exhaust side of the engine so that the exhaust passages 20 in the cylinder block will be shorter than would otherwise be the case, but it will be understood that the working cylinders may be placed in line with the scavenging cylinders, if desired.

From the foregoing description, the operation of the engine will be clear. Assuming that the piston of one of the working cylinders is at bottom dead center, the piston of the scavenging cylinder working with this working cylinder will likewise be at bottom dead center or substantially so, depending upon the offset of the working and scavenging cylinders. On the up stroke the charge in the working cylinder is compressed and the gases in the scavenging cylinder are compressed until the pressure is great enough to open exhaust valve 39 after which the gases in the scavenging cylinder will be forced out into exhaust manifold 42 and thence through a muffler into the atmosphere. In this way the gases in the scavenging cylinder will be driven out until the scavenging cylinder piston reaches top dead center and the pressure of the gases is no longer sufficient to hold valve 39 open. As the piston of the working cylinder nears top dead center, the charge is fired and the piston is forced downwardly on its power stroke. At the same time the piston in the scavenging cylinder is moving downwardly with valve 39 in closed position, thereby producing in the scavenging cylinder an area of low pressure or a partial vacuum. As the working cylinder piston near the bottom of the power stroke, exhaust port 21 will be opened and a portion of the burned gases will flow into exhaust manifold 22 and simultaneously with or immediately after the opening of exhaust port 21, inlet port 37 of the scavenging cylinder will be opened. Due to the difference in pressure in the working and scavenging cylinders, all of the burned gases from the working cylinder will be rapidly drawn through exhaust manifold 22 into the scavenging cylinder through inlet port 37. The volume of the scavenging cylinder is preferably sufficiently large to accommodate all of the burned gases from the working cylinder in their expanded condition so that the working cylinder will be entirely cleared of such gases. It has been determined that the most satisfactory results are obtained when the volume of the scavenging cylinder is approximately three times as great as the volume of the working cylinder, or with a working cylinder bore of 2 13/16 inches, the most satisfactory results are obtained if the bore of the scavenging cylinder is approximately 4 13/16 inches. During the time that the burned gases are being evacuated from the working cylinder, inlet port 18 is open and a fresh charge is flowing into the cylinder, and it will be apparent that as a result of the rapid evacuation of the cylinder of burned gases, the cylinder will be filled with a fresh charge. Then as the pistons move upwardly, the charge in the working cylinder will be compressed and the burned gases in the scavenging cylinder will be compressed until exhaust valve 39 opens and the gases will be forced into exhaust manifold 42 and thence into the atmosphere. The cycle is thereafter repeated as has been described.

With this arrangement, it will be apparent that the working cylinders are thoroughly and rapidly scavenged of burned gases from the lowest possible engine speed to the highest, and that the scavenging is effected without placing the charge under a pressure before the compression stroke that will prohibit throttling of the engine to desired low speeds. The rapid evacuation of the working cylinders aids in drawing a fresh charge into these cylinders and the thoroughness of the scavenging completely fills the cylinders with a fresh charge. As a result, when the engine is throttled down to the lowest speeds there will be no misfiring because of dilution of the charge and as a consequence efficient and smooth operation will be obtained. The increased or greater flexibility of a two-stroke cycle engine made possible by this improved method of scavenging will be apparent.

While this invention has been described as particularly well adapted to the two-stroke cycle engine, it will be understood that it is not intended to limit the invention to this type of engine, since it will be apparent that it may be equally well adapted to other types of engines.

The form of this invention shown and described is to be considered merely as a preferred one, and it is intended that the invention be limited only by the scope of the appended claims.

Having thus described the invention, what is claimed and desired to be secured by Letters Patent, is:

1. In a two-stroke cycle internal combustion engine having a plurality of working cylinders, means for scavenging the working cylinders comprising a plurality of scavenging cylinder each having a piston therein connected to the engine crank shaft, and means including a single manifold to connect each cylinder to a working cylinder when the exhaust port of the working cylinder is open.

2. A two-stroke cycle internal combustion engine having a plurality of working cylinders and a plurality of scavenging cylinders, exhaust ports for the working cylinders, intake ports for the scavenging cylinders, pistons in the scavenging cylinders connected to the engine crank shaft, each scavenging cylinder piston and a working cylinder piston being adapted to occupy substantially similar positions in their respective cylinders throughout the engine cycle, a single conduit connecting the working cylinder exhaust ports and the scavenging cylinder intake ports and an exhaust valve for each of the scavenging cylinders.

3. In a two-stroke cycle internal combustion engine having a crank-shaft of which the cranks are disposed in pairs having the same angular relation about the crank-shaft axis, working cylinders and scavenging cylinders, each having a piston connected to one of said cranks and operable in pairs corresponding to said pairs of cranks, a manifold, exhaust ports for said working cylinders, intake ports for said scavenging cylinders, and means connecting each of said ports to said manifold.

4. In a two-stroke cycle internal combustion engine having a balanced crank-shaft of which the cranks are arranged in pairs in spaced relation about the crank-shaft axis, a plurality of working cylinders having pistons connected to alternate cranks, scavenging cylinders having pistons connected to the other cranks, and means including a manifold common to all the cylinders whereby each working cylinder is scavenged by that scavenging cylinder of which the crank is paired with the crank of said working cylinder.

5. In a two-stroke cycle internal combustion engine, a plurality of alternately disposed working cylinders and scavenging cylinders each having a piston, a crank-shaft operatively connected to said pistons, whereby each working piston operates in phase with one of the scavenging pistons throughout the engine cycle, a manifold common to all said cylinders, a port connecting each of said cylinders to the manifold, a valve means adapted to open said ports when each related pair of pistons is near its bottom, dead-center position.

In testimony whereof I affix my signature.
LIONEL M. WOOLSON.